United States Patent [19]
Barton et al.

[11] 3,904,549
[45] Sept. 9, 1975

[54] FLUIDIZED BED REGENERATION OF POWDERED ACTIVATED CARBON

[75] Inventors: William W. Barton, Stamford; Thomas D. Heath, Westport, both of Conn.

[73] Assignee: Dorr-Oliver Incorporated, Stamford, Conn.

[22] Filed: Nov. 23, 1973

[21] Appl. No.: 418,603

[52] U.S. Cl. ............... 252/417; 34/10; 34/57 A; 201/12; 201/31; 201/37; 202/121; 252/421; 432/15; 432/58
[51] Int. Cl.² ............ B01D 15/06; B01J 37/12; B01J 37/00
[58] Field of Search ............... 252/417, 421, 445

[56] References Cited
UNITED STATES PATENTS

| | | | |
|---|---|---|---|
| 2,933,454 | 4/1960 | Repik et al. | 252/417 |
| 3,541,025 | 11/1970 | Oda et al. | 252/421 |
| 3,542,347 | 11/1970 | Goldney | 432/15 |

FOREIGN PATENTS OR APPLICATIONS

| | | | |
|---|---|---|---|
| 704,810 | 3/1954 | United Kingdom | 252/421 |

*Primary Examiner*—Patrick P. Garvin
*Assistant Examiner*—P. E. Konopka
*Attorney, Agent, or Firm*—H. M. Snyder; Burtsell J. Kearns; Theodore M. Jablon

[57] ABSTRACT

Spent powdered carbon is regenerated in a submerged combustion type fluid bed reactor to produce activated powdered carbon.

8 Claims, 1 Drawing Figure

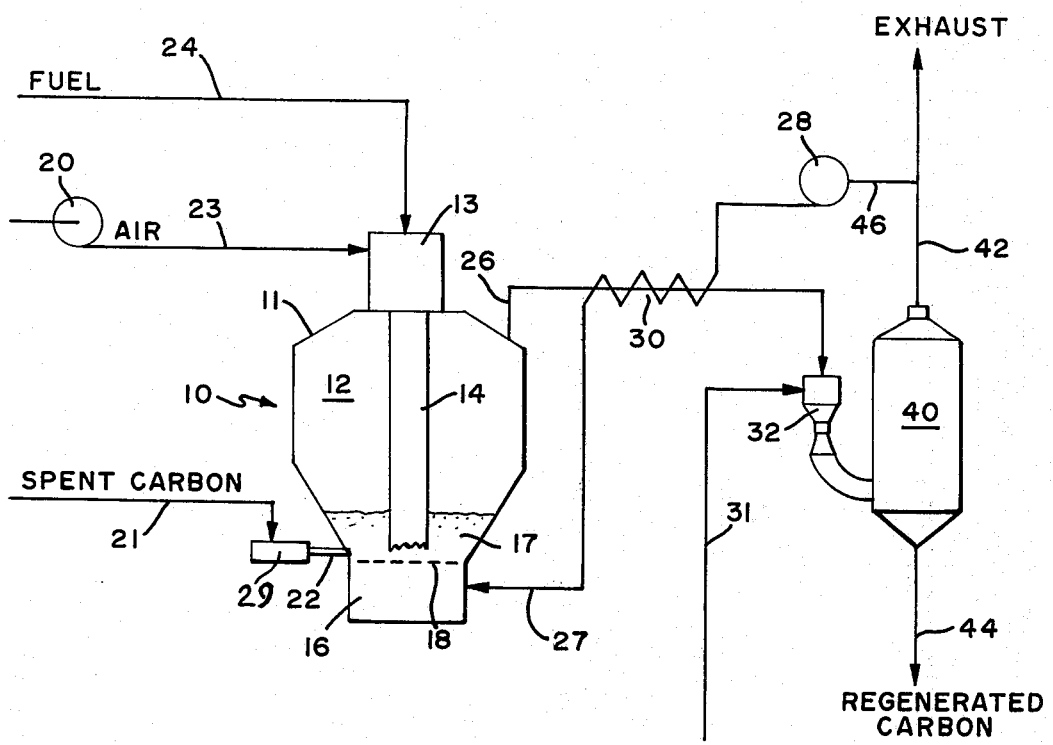

FLUIDIZED BED REGENERATION OF POWDERED ACTIVATED CARBON

This invention relates to a method for regenerating activated powdered carbon which has been utilized in a process such as the treatment of sewage wherein organic matter and chemical oxygen demand materials are adsorbed by the activated powdered carbon.

In recent years there has been a revival of interest in the direct physical-chemical treatment of sewage waste waters. Such a treatment may involve contacting the raw waste water with activated carbon, coagulating with alum and settling with a polyelectrolyte addition. The use of activated carbon in the removal of soluble organics and other pollutants from secondary effluents has also been shown to be feasible. The activated carbon treatment may be used as a "finishing" step for the effluent from the activated sludge process. The activated sludge process is capable of removing the bulk of the organic material from the waste water, yet there remain after this treatment undesirable amounts of organics and other pollutants which can readily be adsorbed on activated carbon.

In one system, granular activated carbon is packed in columns and then the sewage is permitted to flow through the columns which serve the dual function of adsorption and filtration. While this system works quite well, it is clear that construction of the necessary adsorption columns constitutes a very substantial capital cost. In addition, granulated activated carbon is a relatively expensive material and large quantities of it are required in the process.

The use of powdered activated carbon (PAC), on the other hand, does not require the rather elaborate and expensive column structures necessary for the application of granulated activated carbon. Instead, a simple clarifier, often already available on the site, may be used to obtain the desired contact between the PAC and the waste waters. In this case, PAC is merely mixed with the sewage and the mixture is agitated to assure thorough contact. Thereafter, the PAC with adsorbed material thereon is separated from the water by settling or other conventional means. Thus, the use of PAC has certain interesting and advantageous aspects which have led to some rather large-scale experimental and developmental projects involving the treatment of waste waters.

If this process for treating sewage waste waters is to be truly attractive and economical, the PAC used in the treatment must be readily reactivated for recycling in the process. The materials adsorbed on the PAC may be classified into two broad categories; i.e., "volatile" and "non-volatile." As to the adsorbed volatile materials, it is clear that raising the temperature sufficiently in the fluid bed will drive these materials from the surface of the carbon and they will leave the reactor chamber with the gas effluent. On the other hand, merely heating the non-volatile materials is not sufficient to drive them from the carbon surface, and instead, a quantity of oxygen is made available to oxidize these materials whereupon they leave the reaction chamber with the effluent gases in the oxidized form; for example, as $CO_2$, $CO$ or $H_2O$. While the proportion of volatiles to non-volatiles will vary from feed to feed, in most cases, a satisfactory reactivation process must provide for the de-adsorption of both types of materials.

One procedure for carrying out the desired reactivation employs a fluid bed reactor in which a controlled-oxygen reactor atmosphere is maintained together with an optimum fluidized bed temperature of about 1250°F. In accordance with present pilot plant practice, these conditions are obtained by burning fuel in the windbox below the constriction plate of the fluid bed reactor with just slightly in excess of the theoretical amount of air required for perfect combustion and with sufficient recycled stack gas to temper the total gas flow to a temperature of about 2,000°F. Tempering of the combustion gases is necessary to avoid severe damage to the reactor constriction plate. It is these hot gases, containing a small controlled amount of oxygen, which traverse the constriction plate to heat and fluidize the sand bed in the reactor chamber and thereby heat the spent carbon to the desired temperature of about 1,250°F. At this temperature the adsorbed organics and chemical oxygen demand compounds are either volatilized or oxidized by the hot fluidizing gas containing a controlled amount of oxygen. This controlled amount of oxygen is provided by supplying up to 5 to 10 percent excess oxygen over that required for combustion of the fuel to the reactor windbox.

It has been determined that scale-up of this present pilot plant practice to commercial scale operation will result in excessively large and costly reactors with poor thermal efficiency. This is primarily due to the need to accommodate throughout the system the large volume of recycled stack gas which must be introduced into the hot windbox for tempering purposes. It has been demonstrated that a very significant reduction in size of the reactors can be effected by burning additional fuel directly in the bed, a substantial volume of tempering stack gas being replaced in the hot windbox by a smaller volume of excess air to accomplish combustion of the fuel in the bed. In carrying out this modified process, the bed temperature must be increased to at least the ignition temperature of the fuel. Thus, in a pilot plant of this type in which natural gas was burned in the bed, the bed was operated at temperatures between 1,530°F and 1,750°F. At these higher temperatures carbon losses were found to be unacceptably high due to reaction of the oxygen in the fluidizing gas with the carbon as well as with the fuel. In some cases observed, the carbon losses amounted to as much as 50% or more.

While the described regeneration systems have successfully produced reactivated carbon powder, they are uneconomic to build and operate on a commercial scale due to large size, poor thermal efficiency or high carbon loss. It would clearly be highly beneficial to arrive at a regeneration system where the disadvantages detailed above are minimized and with which operations on a commercial scale are economically feasible.

It is an object of this invention to provide a fluid bed process for regenerating spent carbon in which a high degree of recovery is effected.

It is a further object of this invention to accomplish reactivation of powdered activated carbon in a controlled-oxygen environment in which the non-volatile adsorbates are oxidized with minimum oxidation of the original carbon structure.

Other objects and advantages of the invention will become apparent from the following description taken in conjunction with the accompanying drawing in which the FIGURE is a flow diagram of a process in accordance with this invention employing a submerged combustion type fluid bed reactor in the reactivation of powdered carbon.

Generally speaking, the invention is directed to a process in which spent powdered carbon is treated in a fluidized bed reactor of a special type wherein a primary flow of gas fluidizes the bed and a secondary flow of hot combustion gases is introduced directly into the bed without traversing the tuyeres of the constriction plate. The bed is maintained at a predetermined elevated temperature and the reactor atmosphere includes a small controlled amount of oxygen therein.

More specifically, the process of the invention is preferably carried out in a submerged combustion type fluid bed reactor in which combustion of the fuel takes place in a separate combustion chamber and the hot combustion gases are injected directly into the fluidized bed through a burner tube which terminates within the bed. The temperature at which the process of the invention is carried out is preferably about 1,250°F, but it may well fall in the range of from 1,150°F to 1,500°F with satisfactory results. As for the oxygen required to accomplish oxidation of the non-volatile adsorbates, an effective amount of up to about from 5 to 10 percent excess oxygen over the theoretical amount necessary to burn the fuel must be present in the combustion gases to achieve the required oxidation. The primary flow of gas for fluidizing the bed may be recycled exhaust or stack gases which have been reheated. It is possible, through less convenient, to introduce a part, or even all, of the oxygen required in the fluid bed in mixture with the recycled stack gas, rather than introducing all of the required oxygen with the combustion gases.

Referring to the FIGURE, there is shown a submerged combustion fluid bed reactor 10 in a system for regenerating powdered carbon. This type of fluid bed reactor is disclosed generally in U.S. Pat. No. 3,542,347, issued Nov. 24, 1970 to L. H. Goldney et al. The reactor 10 comprises a reactor vessel 11 which encloses a reaction compartment 12 separated from the windbox 16 by the constriction plate 18. The constriction plate 18 supports a fluid bed 17 of fine inert particulate material. A combustion chamber 13 is mounted on top of the reactor vessel 11 and a burner tube 14 connects the combustion chamber 13 to a point well within the expanded fluidized bed 17 at which point the hot gases are discharged directly into the bed. A water slurry of spent carbon flowing through line 21 is injected into the fluidized bed by pump 29 through feedline 22. A single feedline 22 is illustrated although it will be understood that the spent carbon slurry may be fed into the fluidized bed at more than one point. Fuel line 24 is provided for supplying the combustion chamber 13 with fuel, while air is supplied to chamber 13 by blower 20 through line 23. The exhaust conduit 26 is provided for removing hot gases and the product reactivated powdered carbon from the reaction chamber 12 and conducting these gaseous and solid products to the Venturi scrubber 32. Scrubber fluid (usually water) is introduced into the Venturi scrubber through line 31 and the gases and slurried PAC are conducted to the separator 40. The water used in the scrubber need not be of high purity or potability and, in fact, secondary effluent from the activated sludge process, which contains a certain amount of organics, is perfectly satisfactory for this scrubbing function. The exhaust gases leave the separator 40 through line 42, while the slurried regenerated carbon exits from the separator through line 44 for reuse and may be applied in slurry form to the sewage effluent. A portion of the exhaust gases leaving the separator 40 through line 42 is drawn off through line 46 to blower 28, optionally passed through a heat recuperator 30, and thence line 27 into the windbox of the reactor 10 to fluidize the fluid bed 17.

Turning now to a more detailed consideration of the operation of the system, dewatered spent powdered carbon (approximately 25 percent total solids) is fed into the fluidized bed at one or more points. An inert bed of sand, having a particle size of approximately −15 to +30 mesh, is fluidized by heated recycled stack gas entering the reaction chamber through non-shifting tuyeres (not illustrated) in the constriction plate 18. The bed is maintained at a temperature of from about 1,150°F to about 1,500°F, preferably about 1,250°F, by very hot gases which are discharged from the tube 14 extending into the bed with the open, serrated end thereof located a short distance above the constriction plate 18. The top of the refractory-lined tube 14 connects to the high intensity combustion chamber 13 mounted on top of the reactor. This combustion chamber burns oil or gas under conditions such that a controlled amount of oxygen is introduced into the fluid bed from this source. The temperature of the gas as it enters the fluid bed from the burner tube 14 may be substantially in excess of 3000°F, but the high degree of agitation of bed particles, and the excellent heat transfer properties characterizing fluid beds, prevents localized overheating and the bed temperature is quite uniform in the desired range of from about 1,150°F to about 1,500°F. As illustrated, the exhaust gases exiting from the reactor through line 26 pass through the heat recuperator 30 to heat the recycled fluidizing gas and to prevent condensation of water in the fluidizing gas. The regenerated carbon is recovered in the Venturi scrubber 32 as described above. Thus, heat in the fluidized bed is used to drive the adsorbed volatile impurities from the spent carbon while the controlled amount of oxygen present oxidizes the non-volatile impurities.

The use of submerged combustion in the proposed process permits operation of the fluidized bed at what appears to be the optimum temperature for carbon reactivation with minimum loss. Oxygen in the bed is controlled to minimize oxidation of the carbon and thereby maximize recovery of product. Windbox temperature is drastically reduced, thereby eliminating the need for special high-temperature construction materials in the windbox and constriction plate. On the other hand, heat is transferred to the fluidized bed from the much hotter submerged combustion gases thereby significantly improving the heating efficiency of the process. Reactor size in the proposed process is significantly reduced from the prior art.

For the purpose of illustrating the advantages of the invention to those skilled in the art, the following example is given:

EXAMPLE

A fluidized bed reactor of the type illustrated in the FIGURE has a bed diameter of five feet. In typical operation, the combustion chamber burns 56 gallons of Bunker "C" oil per hour and requires 1,475 cubic feet per minute of air to support combustion with 5 percent excess oxygen remaining in the fluidized bed. The combustion gases are at a temperature of over 3,000°F in the burner tube. A constriction plate supports a 48 inch deep sand bed (expanded) having a particle size of from −15 to +30 mesh, at the bottom of the reaction zone of the fluidized bed reactor. In order to fluidize the bed, about 419 standard cubic feet per minute of recycled exhaust gas at a temperature of about 800°F is provided to the windbox below the constriction plate. In operation, bed temperature is about 1,250°F. A slurry of spent carbon at ambient temperature is fed directly into the bed at the rate of about two tons per hour of which 1,000 pounds is carbon and the balance is essentially water. With this type of reaction about 850 to 950 lbs./hr. of reactivated powdered carbon is produced in a water slurry. The loss of carbon in the reaction thus amounts to from about 5 to about 15 percent.

It is clear from the above results that the process described has effected substantial improvement over the prior art results wherein as much as 50 percent or higher losses were sustained.

In some cases, it may be desirable to reduce somewhat the temperature of the gases in the burner tube. In that event, recycled stack gas can be introduced near the exit of the combustion chamber. Tempering of the combustion gases with stack gas will substantially extend the life of the burner tube.

In addition the technical improvements of the process of the invention over the prior art, the process described has lower capital and operating costs. For instance, the bed diameter of the reactor in the above example is 5 feet for a throughout of 1,000 pounds per hour of carbon and 3,000 pounds per hour of water. The bed diameter of a reactor according to the prior art with equal throughout and with 5 percent excess oxygen in the fluidized bed would be about 15.0 feet without direct fuel injection (i.e., with the products of combustion tempered to 2,000°F with recycled stack gas in the windbox). The freeboard diameter of the reactor in the above example is 10.0 feet, whereas the freeboard diameter of a reactor according to the prior art with equal throughout would be about 15.0 feet. Bunker C oil consumption in the above example is 56 gallons of oil per hour, whereas oil consumption of a reactor according to the prior art with equal throughput would be about 110 gallons per hour without reheat of the recycled stack gas and about 84 gallons per hour with reheat of the recycled stack gases to 800°F. Recycled stack gas flow in the above example is only about 15½ percent of that required without reheat and about 12 ½ percent of that required with reheat in the regeneration systems in the prior art.

Separation of the reactivated powdered carbon from the hot exhaust gases may be effected in two steps in which the coarser particles are separated in the first step in cyclonic type particle collectors and the finer particles are separated in the second step in the Venturi scrubber and separator. This alternative separating technique provides the coarse fraction of the product in a dry state.

Although the present invention has been described in connection with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

We claim:

1. A fluid bed process for regenerating powdered activated carbon having adsorbed organics thereon by volatilizing or oxidizing said organics at a temperature in the range from about 1,150°F to about 1,500°F, comprising the steps of fluidizing a bed of particulate inert material by passing a primary flow of substantially oxygen-free gas through a constriction plate supporting said bed, charging a water slurry of spent carbon into the fluidized bed, introducing through a burner tube a secondary flow of hot combustion gases containing a controlled amount of excess oxygen therein directly into the fluidized bed at a location within the fluidized bed and substantially above said constriction plate to raise the bed temperature to the desired range and thereby volatilize the organis and to oxidize nonvolatile adsorbates, removing the reactivated carbon powder from the reactor by elutriation with the reactor exhaust gases, separating the carbon powder from the exhaust gases and recovering the powdered activated carbon.

2. The process of claim 1 wherein said hot combustion gases do not traverse said constriction plate and said excess oxygen is present in said hot combustion gases in an effective amount of up to about 5 to 10 percent.

3. The process of claim 2 wherein the fluidizing gas for the inert bed of particulate material is recycled stack gas 4. The process of claim 3 wherein stack gas for fluidizing the bed is first passed in heat exchange with the exhaust gases from the reactor.

5. The process of claim 3 wherein separation of the reactivated carbon powder from the reactor exhaust gases is effected by scrubbing the exhaust gases with water.

6. The process of claim 5 wherein the water used in scrubbing the exhaust gases is the secondary effluent of an activated sludge process.

7. The process of claim 3 wherein a quantity of recycled stack gas is mixed with said hot combustion gases prior to introduction into said fluidized bed to temper said combustion gases without introducing oxygen into said bed.

8. The process of claim 1 wherein the fluidizing gas for the inert bed of particulate material is recycled stack gas and wherein at least a portion of the oxygen required in the fluid bed is introduced into the substantially oxygen-free recycled stack gas before said stack gas is passed into said bed.

* * * * *

UNITED STATES PATENT OFFICE
CERTIFICATE OF CORRECTION

Patent No. 3,904,549　　　　　　　　Dated September 9, 1975

Inventor(s) William W. Barton and Thomas D. Heath

It is certified that error appears in the above-identified patent and that said Letters Patent are hereby corrected as shown below:

Column 3, line 29, change "through" to --though--.

Column 4, line 14, change "non-shifting" to --non-sifting--.

Column 5, lines 31 and 34, change "throughout" to --throughput--, both occurrences.

Claim 1, column 6, line 24, change "organis" to --organics--.

Signed and Sealed this twenty-fifth Day of November 1975

[SEAL]

Attest:

RUTH C. MASON
*Attesting Officer*

C. MARSHALL DANN
*Commissioner of Patents and Trademarks*